US008147789B2

(12) United States Patent
Cannady et al.

(10) Patent No.: US 8,147,789 B2
(45) Date of Patent: Apr. 3, 2012

(54) COMPOSITION COMPRISING NEOPENTASILANE AND METHOD OF PREPARING SAME

(75) Inventors: John Patrick Cannady, Midland, MI (US); Xiaobing Zhou, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 545 days.

(21) Appl. No.: 12/440,299

(22) PCT Filed: Aug. 29, 2007

(86) PCT No.: PCT/US2007/019165
§ 371 (c)(1),
(2), (4) Date: Mar. 6, 2009

(87) PCT Pub. No.: WO2008/051328
PCT Pub. Date: May 2, 2008

(65) Prior Publication Data
US 2010/0176338 A1 Jul. 15, 2010

Related U.S. Application Data

(60) Provisional application No. 60/853,958, filed on Oct. 24, 2006.

(51) Int. Cl.
*C01B 33/04* (2006.01)
(52) U.S. Cl. ...................................... 423/347; 423/345
(58) Field of Classification Search .................. 423/347, 423/345
See application file for complete search history.

(56) References Cited

U.S. PATENT DOCUMENTS

2004/0224089 A1   11/2004   Singh et al.
2007/0240632 A1   10/2007   Singh et al.

FOREIGN PATENT DOCUMENTS

| JP | 60242613 | 12/1985 |
| JP | 61091010 | 5/1986 |
| WO | WO 02/064853 | 8/2002 |
| WO | WO 02/065516 | 8/2002 |
| WO | WO 02/065517 | 8/2002 |
| WO | WO 02/080244 | 10/2002 |
| WO | WO 2004/036631 | 4/2004 |

OTHER PUBLICATIONS

Laximan, R.K.; Anderson, T.D.; Mestemacher, J.A.; Materials: A Low-Temperature Solution for Silicon Nitride Deposition, Solid State Technology, April 200, 43(4), 79.
Dussarrat, C.; Girad, J.M., Kimura, T.; The Cl & C—Free Trisilylamine (TSA): A Promising Solution for Low Temperature CVD of Silicon Nitride, SSEMICON West 2003.
Flippo, B.G.; Crawford, S., Hexachlorodisilane Abatement Utilizing an ATMI Integrated Scrubber with Steam Reagent, SEMICON West 2003.
Ogawa, K.; Shimizu, I.; Eiichi, I., Preparation of Hydrogenated Amorphous Silicon From Higher Silanes (SinH2n+2) with the High Growth Rate, Japanese Journal of Applied Physics 1981, 20(9), L639.
Low-temperature chemical-vapor-deposition of silicon nitride. Kanoh, H.; Sugiura, O.; Fujioka, S. Aramaki, Y.; Hattori, T.; Matsumura, M., Low-Temperature Chemical-Vapor-Deposition of Silicon Nitride. Journal de Physique Proceedings IV: (1991), 1(C2, Proc. Eur. Conf. Chem. Vap. Deposition, 8th 1991), C2/831.
J.C. Sturm et al.: Chemical Vapor Deposition Epitaxy of Silicon-Carbon Alloys at High Rates and Low Temperatures using Neopentasilane, Princeton Institute of Science and Technology of Materials and Department of Electrical Engineering, Princeton, NJ and Applied Materials, Santa Clara, CA.
K H Chung, et al.: The high growth rate of epitaxial silicon-carbon alloys by using chemical vapour deposition and neopentasilane, Semicond. Sci. Technol., vol. 22, Dec. 7, 2006, p. 158-160, Princeton Institute of Science & Technology of Materials & Dept. of Electrical Engineering, Princeton, NJ & Applied Materials, Santa Clara, CA.
Feher et al., Inorg. Nucl. Chem. Lett. 1974, 10(7), 577-579.
Hoefler et al., Inorg. Chem. Lett 1973, 9(7), 723-725.
Andrews et al.: Further Studies on the Silicon-Germanium Hydrides, (J. Chem. Soc. A: Inorganic, Physical, Theoretical 1966, (1), 46-48).

*Primary Examiner* — Edward Johnson
(74) *Attorney, Agent, or Firm* — Erika Takeuchi

(57) ABSTRACT

A composition comprising at least 93% (w/w) neopentasilane; and a method of preparing neopentasilane, the method comprising treating a tetrakis-(trihalosilyl)silane with diisobutylaluminum hydride.

11 Claims, No Drawings

COMPOSITION COMPRISING NEOPENTASILANE AND METHOD OF PREPARING SAME

CROSS-REFERENCE TO RELATED APPLICATIONS

This application is a U.S. national stage filing under 35 U.S.C. §371 of PCT Application No. PCT/US07/019,165 filed on 29 Aug. 2007, currently pending, which claims the benefit of U.S. Provisional Patent Application No. 60/853,958 filed 24 Oct. 2006 under 35 U.S.C. §119 (e). PCT Application No. PCT/US07/019,165 and U.S. Provisional Patent Application No. 60/853,958 are hereby incorporated by reference.

FIELD OF THE INVENTION

The present invention relates to a composition comprising neopentasilane and more particularly to a composition comprising at least 93% (w/w) of neopentasilane. The present invention also relates to a method of preparing a composition comprising neopentasilane, the method comprising treating a tetrakis(trihalosilyl)silane with diisobutylaluminum hydride.

BACKGROUND OF THE INVENTION

Neopentasilane and methods of preparing the compound are known in the art. For example, Feher et al. (Inorg. Nucl. Chem. Lett. 1974, 10(7), 577-579) report the preparation of mixture of silanes, including neopentasilane, by acid decomposition of magnesium silicide and separation by distillation and gas chromatography.

Hoefler et al. (Inorg. Chem. Lett. 1973, 9(7), 723-725) report the hydrogenation of tetrakis(trichlorosilyl)silane with lithium aluminum hydride in diethyl ether at −100° C. to give a yellow-brown polymer which contained a 1:2 isotetrasilane-neopentasilane mixture.

Andrews et al. (J. Chem. Soc. A: Inorganic, Physical, Theoretical 1966, (1), 46-48) report the preparation of high molecular weight silicon-germanium hydrides using a silent electric discharge of 40 kV for 5-10 h in a conventional ozonizer tube maintained at −20° C. From the starting materials $GeH_4$, $SiH_4$, and $Si_2H_6$, the products isolated by gas-liquid chromatography included, among others, neopentasilane.

Although the aforementioned references describe the preparation of neopentasilane by various methods, including reduction of halosilanes, there remains a need for a method of preparing neopentasilane having high purity in high yield that is scaleable to a commercial manufacturing process.

SUMMARY OF THE INVENTION

The present invention is directed to a composition comprising:
at least 93% (w/w) of neopentasilane;
not greater than 5% (w/w) of other silanes; and
not greater than 2% (w/w) of hydrocarbons.

The present invention is also directed to a method of preparing a composition comprising neopentasilane, the method comprising:
(i) treating a hexahalodisilane having the formula $X_3SiSiX_3$, wherein X is —Cl or —Br, with a tertiary amine catalyst to produce a first mixture comprising a tetrakis(trihalosilyl)-silane and a silicon tetrahalide;
(ii) separating the tetrakis(trihalosilyl)silane and the silicon tetrahalide;
(iii) treating the separated tetrakis(trihalosilyl)silane with diisobutylaluminum hydride to produce a second mixture comprising neopentasilane; and
(iv) distilling the second mixture to remove the neopentasilane.

The composition of the present invention contains neopentasilane in a state of high purity. In particular, the composition typically contains at least 93% (w/w) neopentasilane, not greater than 5% (w/w) of other silanes, and not greater than 2% (w/w) of hydrocarbons, based on the total weight of the composition.

The method of the present invention produces neopentasilane having high purity in high yield. Importantly, the neopentasilane can be readily and efficiently removed from the reaction mixture by distillation. This separation minimizes the occurrence of unwanted side reactions that diminish purity and yield. Also, the neopentasilane is free of solvent, which can be deleterious in certain applications, especially in the electronics field. Further, the method can be carried out economically with a stoichiometric amount or only slight excess of diisobutylaluminum hydride. Still further, the method can be scaled to a commercial manufacturing process.

The neopentasilane of the present invention can be used as a precursor for the formation of silicon-containing films, such as silica, silicon carbide, and silicon nitride, by chemical or physical vapor deposition.

DETAILED DESCRIPTION OF THE INVENTION

A composition according to the present invention comprises:
at least 93% (w/w) of neopentasilane;
not greater than 5% (w/w) of other silanes; and
not greater than 2% (w/w) of hydrocarbons.

The composition comprises at least 93% (w/w), alternatively at least 95% (w/w), alternatively at least 98% (w/w), of neopentasilane, based on the total weight of the composition. For example, the composition typically comprises 93 to 100% (w/w), alternatively from 95 to 99% (w/w), alternatively from 97 to 99% (w/w), alternatively from 99 to 99.9% (w/w), of neopentasilane.

In addition to the neopentasilane, the composition comprises not greater than 5% (w/w), alternatively not greater than 3% (w/w), alternatively not greater than 1% (w/w), of at least one other silane, based on the total weight of the composition. Examples of other silanes include, but are not limited to, silanes having the following formulae: $Si_3H_8$, $Si_4H_{10}$, $Si_6H_{14}$, $Si_7H_{16}$, iso-$BuSiH_3$, $H_2(CH_3)SiSi(SiH_3)_3$, and $H_2$(iso-Bu)SiSi(SiH_3)_3$, where iso-Bu is isobutyl.

The composition also comprises not greater than 2% (w/w), alternatively not greater than 1% (w/w), of at least one hydrocarbon, based on the total weight of the composition. Examples of hydrocarbons include, but are not limited to, aliphatic hydrocarbons such as isobutane, pentane, and hexanes; and aromatic hydrocarbons such as toluene.

The weight percent of neopentasilane, other silane(s), and hydrocarbon(s) in the composition can be determined from the proton nuclear magnetic resonance ($^1$H NMR) spectrum of the composition as described below in the Examples section.

According to the present invention, a method of preparing a composition comprising neopentasilane comprises:
(i) treating a hexahalodisilane having the formula $X_3SiSiX_3$, wherein X is —Cl or —Br, with a tertiary amine catalyst to produce a first mixture comprising a tetrakis(trihalosilyl)-silane and a silicon tetrahalide;

(ii) separating the tetrakis(trihalosilyl)silane and the silicon tetrahalide;

(iii) treating the separated tetrakis(trihalosilyl)silane with diisobutylaluminum hydride to produce a second mixture comprising neopentasilane; and (iv) distilling the second mixture to remove the neopentasilane.

In step (i) of the present method, a hexahalodisilane having the formula $X_3SiSiX_3$, wherein X is —Cl or —Br, is treated with a tertiary amine catalyst to produce a first mixture comprising a tetrakis(trihalosilyl)silane and a silicon tetrahalide.

The hexahalodisilane can be a single hexahalodisilane or a mixture comprising two or more different hexahalodisilanes. For example the hexahalodisilane can be hexachlorodisilane, hexabromodisilane, or a mixture of hexachlorodisilane and hexabromodisilane.

Methods of preparing hexahalodisilanes are known in the art. For example, hexachlorodisilane can be prepared by reacting silicon metal with hydrogen chloride and removing the product having a boiling point of 144-146° C. Also, hexabromodisilane can be prepared by treating calcium silicide with oxygen and bromine gases and subsequently distilling the reaction products at 130-140° C. wider a pressure of 20 kPa to 27 kPa. Alternatively, hexabromodisilane can be prepared by reacting calcium silicide with bromine, as exemplified by Walter C. Schumb (Inorg. Synth. II, 1946, 98-102).

The tertiary amine catalyst can be a monoamine, diamine, triamine, or polyamine. Moreover, the tertiary amine catalyst can have an acyclic, cyclic, or acyclic/cyclic structure. Examples of tertiary amine catalysts include, but are not limited to, monoamines, such as trimethylamine, triethylamine, tri-n-propylamine, triisopropylamine, tri-n-butylamine, tri-sec-butylamine, tri-tert-butylamine, tri-n-pentylamine, tri-n-hexylamine, N-methyldiethylamine, N-methyldi-n-propylamine, N-methyldiisopropylamine, N-methyldi-n-butylamine, N-methyldi-sec-butylamine, N-methyldi-tert-butylamine, N-methyldi-n-pentylamine, N-methyldi-n-hexylamine, N,N-dimethylethylamine, N,N-di-n-propylethylamine, N,N-diisopropylethylamine, N,N-di-n-butylethylamine, N,N-di-sec-butylethylamine, N,N-di-tert-butylethylamine, N,N-dimethylhexylamine, N,N-dimethylheptylamine, N,N-dimethyloctylamine, N,N-dimethylnonylamine, N,N-dimethyldecylamine, tricyclopropylamine, tricyclobutylamine, tricyclopentylamine, tricyclohexylamine, dimethylcyclopropylamine, dimethylcyclobutylamine, dimethylcyclopentylamine, dimethylcyclohexylamine, methyldicyclopropylamine, methyldicyclobutylamine, methyldicyclopentylamine, methyldicyclohexylamine, diethylcyclopropylamine, diethylcyclobutylamine, diethylcyclopentylamine, diethylcyclohexylamine, ethyldicyclopropylamine, ethyldicyclobutylamine, ethyldicyclopentylamine, and ethyldicyclohexylamine; diamines, such as N,N,N',N'-tetramethylmethylenediamine, N,N,N',N'-tetramethyl(1,1) ethylenediamine, N,N,N',N'-tetramethyl(1,2) ethylenediamine, N,N,N',N'-tetramethyl(1,1) propylenediamine, N,N,N',N'-tetramethyl(2,2) propylenediamine, N,N,N',N'-tetramethyl(1,2) propylenediamine, N,N,N',N'-tetramethyl(1,3) propylenediamine, N,N,N',N'-tetraethyl(1,2) ethylenediamine, diazobicyclo[2.2.2]octane, and diazobicyclo[3.3.3]decane; triamines, such as 1,1,4,7,7-pentamethyldiethylenetriamine; and polyamines, such as poly (N-methylethyleneimine) and poly(N-alkylethyleneimine).

The tertiary amine catalyst can be a single tertiary amine or a mixture comprising two or more different tertiary amines, each as described above.

The hexahalodisilane can be treated with the tertiary amine catalyst in any standard reactor suitable for contacting chlorosilanes with a tertiary amine. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The hexahalodisilane and the tertiary amine catalyst can be combined in any order. Typically the tertiary amine catalyst is added to the hexahalodisilane with vigorous agitation. However, reverse addition, i.e. addition of the tetrakis(trihalosilyl) silane to the tertiary amine catalyst is also possible.

The rate of addition of the tertiary amine catalyst to the hexahalodisilane (or vice-versa) is typically such that the temperature of the reaction mixture remains below the decomposition temperature of the tetrakis(trihalosilyl)silane.

The hexahalodisilane is typically treated with the tertiary amine catalyst at a temperature of −10 to 300° C., alternatively from 0 to 100° C., alternatively form 0 to 60° C., alternatively from 20 to 60° C. When the temperature is above 300° C., the tetrakis-(trihalosilyl)silane is subject to decomposition.

The reaction time depends on several factors, including the structures of the hexahalodisilane and the tertiary amine catalyst, and the temperature. The reaction time is typically from 1 to 24 h, alternatively from 1 to 12 h., alternatively from. 1 to 6 h, at a temperature of from 20 to 60° C. The optimum reaction time can be determined by routine experimentation using the methods set forth in the Examples section below.

The concentration of the tertiary amine catalyst in the first reaction mixture is typically from 0.001 to 10% (w/w), alternatively from 0.01 to 1% (w/w), alternatively from 0.01 to 0.1% (w/w), based on the weight of the hexahalodisilane.

Step (i) of the present method can be carried out either in the presence or absence of an organic solvent. The organic solvent can be any aprotic or dipolar aprotic organic solvent that does not react with the hexahalodisilane, the tertiary amine catalyst, or the tetrakis(trihalosilyl)silane product under the conditions of the present method.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; ketones such as methyl isobutyl ketone (MIBK); halogenated alkanes such as trichloroethane; and halogenated aromatic hydrocarbons such as bromobenzene and chlorobenzene.

The organic solvent can be a single organic solvent or a mixture comprising two or more different organic solvents, each as described and exemplified above.

When present, the concentration of the organic solvent is typically from 1 to 99% (w/w), alternatively from 10 to 99% (w/w), alternatively from 50 to 99% (w/w), alternatively from 50 to 75% (w/w), based on the total weight of the first reaction mixture.

In step (ii) of the present method, the tetrakis(trihalosilyl) silane and the silicon tetrahalide are separated. The separation can be carried out by applying a vacuum to the mixture to remove the silicon tetrahalide and any organic solvent. For example, the separation can be carried out by applying a vacuum of 1.3 Pa to the mixture at a temperature of 60° C. for 7 h and collecting the silicon tetrahalide and any solvent in a cold trap.

In step (iii) of the present method, the separated tetrakis(trihalosilyl)silane is treated with diisobutylaluminum hydride to produce a second mixture comprising neopentasilane.

The diisobutylaluminum hydride is commercially available in liquid form neat or as a solution in various organic solvents. However, some solvents may distill with the neopentasilane in step (iv) of the method and contaminate the product. Such contamination can cause problems in certain applications, particularly in the electronics field, that require high purity.

The tetrakis(trihalosilyl)silane can be treated with the diisobutylaluminum hydride in any standard reactor suitable for contacting a halosilane with a metal hydride reducing agent. Suitable reactors include glass and Teflon-lined glass reactors. Preferably, the reactor is equipped with a means of agitation, such as stirring. Also, because the neopentasilane is pyrophoric, the reaction is typically carried out in an inert atmosphere. This can be accomplished by purging the reactor with a dry inert gas, such as nitrogen or argon, prior to introduction of the reactants and maintaining a blanket of the gas in the reactor.

The tetrakis(trihalosilyl)silane and the diisobutylaluminum hydride can be combined in any order. Typically, the diisobutylaluminum hydride is added to the solid tetrakis(trihalosilyl)silane. However, reverse addition, i.e. addition of the tetrakis(trihalosilyl)silane to the diisobutylaluminum hydride is also possible. In this case, the tetrakis(trihalosilyl)silane is typically added to the diisobutylaluminum hydride as a solution in an organic solvent.

The rate of addition of the diisobutylaluminum hydride to the tetrakis(trihalosilyl)silane (or vice-versa) is typically such that the temperature of the reaction mixture remains below the decomposition temperature of the tetrakis(trihalosilyl)silane.

The tetrakis(trihalosilyl)silane is typically treated with the diisobutylaluminum hydride at a temperature of from −10 to 300° C., alternatively from 0 to 100° C., alternatively form 0 to 60° C., alternatively from 20 to 60° C.

The reaction time depends on several factors, including the structures of the tetrakis(trihalosilyl)silane and the temperature. The reaction is typically carried out for an amount of time sufficient to complete reduction of the tetrakis(trihalosilyl)silane to the neopentasilane. As used herein, the term "to complete reduction" means the silicon-bonded halogen atoms originally present in the tetrakis(trihalolsilyl)silane are replaced with hydrogen atoms. For example, the reaction time is typically from 0.1 to 4 h, alternatively from 0.5 to 2 h, alternatively 1 to 2 h, at a temperature of from 20 to 60° C.

The mole ratio of the diisobutylaluminum hydride to the tetrakis(trihalosilyl)silane is typically from 12 to 16, alternatively from 12 to 14, alternatively from 13 to 14. When the mole ratio is less than 12, the mixture will contain unreacted tetrakis(trihalosilyl)silane in addition to neopentasilane. When the mole ratio is greater than 16, the cost of the process is increased unnecessarily.

Step (iii) of the present method can be carried out either in the presence or absence of an organic solvent. The organic solvent can be any aprotic or dipolar aprotic organic solvent that does not react with the tetrakis(trihalosilyl)silane, the diisobutylaluminum hydride, or the neopentasilane product under the conditions of the present method. Examples of suitable solvents are as described and exemplified above for step (i) of the present method.

In step (iv) of the present method, the second mixture is distilled to remove the neopentasilane. The second reaction mixture can be distilled at atmospheric or subatmospheric pressure. For example, the second reaction mixture is typically distilled under reduced pressure at a temperature not greater than 100° C. As used herein, the term "reduced pressure," means a pressure less than atmospheric pressure sufficient to volatilize the neopentasilane and remove it from the reaction mixture. The particular pressure depends on the distillation temperature. For example, the pressure can be from 13.3 mPa to 20 kPa at a temperature of from 0 to 100° C., alternatively from 133 mPa to 6.7 kPa at a temperature of from 5 to 80° C., alternatively from 1.33 to 133 Pa at a temperature of from 20 to 60° C. As the distillation temperature increases in the above ranges, the pressure required for volatilization of neopentasilane decreases. Also, when a solvent is present, the solvent typically has a boiling point such that it does not co-distill with the neopentasilane.

Steps (iii) and (iv) of the present method can be carried out in sequential order or simultaneously. For example, the tetrakis(trihalosilyl)silane can be treated with the diisobutylaluminum hydride followed by distillation of the reaction mixture to remove the neopentasilane. Alternatively, the tetrakis(trihalosilyl)silane can be treated with the diisobutylaluminum hydride with concomitant distillation of the reaction mixture to remove the neopentasilane as it is formed, thus minimizing the occurrence of unwanted side reactions that can diminish purity and yield.

If desired, the neopentasilane obtained by the method of the present invention can be further purified by at least one more distillation. For example, the neopentasilane is typically distilled at a temperature of less than 100° C. under reduced pressure.

The composition of the present invention contains neopentasilane in a state of high purity. In particular, the composition typically contains at least 93% (w/w) neopentasilane, not greater than 5% (w/w) of other silanes, and not greater than 2% (w/w) of hydrocarbons, based on the total weight of the composition.

The method of the present invention produces neopentasilane having high purity in high yield. Importantly, the neopentasilane can be readily and efficiently removed from the reaction mixture by distillation. This separation minimizes the occurrence of unwanted side reactions that diminish purity and yield. Also, the neopentasilane is free of solvent, which can be deleterious in certain applications, especially in the electronics field. Further, the method can be carried out economically with a stoichiometric amount or only slight excess of diisobutylaluminum hydride. Still further, the method can be scaled to a commercial manufacturing process.

The neopentasilane of the present invention can be used as a precursor for the formation of silicon-containing films, such as silica, silicon carbide, and silicon nitride, by chemical or physical vapor deposition.

EXAMPLES

The following examples are presented to further illustrate the composition and method of the present invention, but are not to be considered as limiting the invention, which is delineated in the following claims. Unless otherwise noted, all parts and percentages reported in the examples are by weight. The following methods and materials were employed in the examples:

Proton NMR Spectra

Proton nuclear magnetic resonance spectra ($^1$H NMR) of neopentasilane compositions were obtained using a Varian VXR 400 MHz NMR spectrometer. The samples (~0.2 mL) were dissolved in 1.0 mL of benzene-$d_6$ in an NMR tube having a diameter of 5 mm. The chemical shift values (δ) reported in the examples are in units of parts per million (ppm), measured relative to benzene-$d_6$.

Gas Chromatography-Mass Spectrometry

The components of neopentasilane compositions were identified using a gas chromatograph-mass spectrometer comprised of an HP 6890 gas chromatograph, equipped with a DB-1 column (30 b×0.25 mm), interfaced to an HP 5972 Mass Selective Detector Quadrupole Mass Spectrometer. Oven temperature was held at 35° C. for 4 min., increased to 250° C. at a rate of 15° C./min., and held at 250° C. for 5 min.

Hexachlorodisilane, 99+%, was prepared and purified at Dow Corning Corporation as a by-product in the preparation of trichlorosilane from gaseous HCl and silicon.

1,4-Diazabicyclo[2.2.2]octane, 98%, was obtained from Aldrich (Milwaukee, Wis.) and used as received.

Diisobutylaluminum hydride, reagent grade, was obtained from Aldrich (Milwaukee, Wis.), and degassed under vacuum for 30 min. prior to use.

Example 1

A solution of 0.23 g of 1,4-diazabicyclo[2.2.2]octane in 2.5 mL of diethyl ether was added under dry nitrogen to 230 grams (0.86 mol) of hexachlorodisilane in a 250-mL two-neck round bottom flask, with stirring. The mixture was allowed to stand undisturbed overnight, during which time a precipitate formed. The mixture was heated at 60° C. under a pressure of 1.3 Pa for 7 hours to give 118 g of tetrakis(trichlorosilyl)silane as a white powder. $^{29}$Si NMR and GC-MS analysis confirmed the identity of the product.

Example 2

A solution of 3.93 g (6.94 mmol) of tetrakis(trichlorosilyl)silane in 21.8 mL of diisopropylbenzene was added under dry nitrogen to 17.1 mL (95.8 mmol) of diisobutylaluminum hydride in a Schlenk flask at a rate such that the temperature of the mixture remained less than 60° C. After the addition was complete, the mixture was stirred for 1 h at room temperature. The mixture was then heated at 50° C. under a pressure of 1.3 Pa and the volatile components were collected in a cold trap. The condensate contained 0.81 g (54% w/w) of neopentasilane, 0.61 g (41% w/w) of diisopropylbenzene, and 0.07 g (5% w/w) of other silanes, as determined GC-MS and $^1$H NMR.

Example 3

Diisobutylaluminum hydride (43.2 mL, 242 mmol) was added under dry nitrogen to 9.93 grams (17.5 mmol) of tetrakis(trichlorosilyl)silane in a 250 milliliter Schlenk flask at a rate such that the temperature of the mixture remained less than 60° C. After the addition was complete, the mixture was stirred for 1 h at room temperature. The mixture was then heated at 50° C. under a pressure of 1.3 Pa and the volatile components were collected in a cold trap. The condensate contained 1.9 g (93% w/w) of neopentasilane, 5% of other silanes, and 2% w/w of hydrocarbons, as determined GC-MS and $^1$H NMR.

Example 4

Diisobutylaluminum hydride (550 g, 3.90 mol) was added under dry nitrogen to 160 grams (0.283 mol) of tetrakis(trichlorosilyl)silane in a two liter four-neck flask equipped with a mechanical stirrer, at a rate such that the temperature of the mixture remained less than 55° C. After the addition was complete, the mixture was stirred for 2 h at room temperature. The mixture was distilled at 80° C. under vacuum (<133 Pa) using a short path distillation apparatus to produce 41 g of neopentasilane. The preceding procedure was repeated four more times to obtain a total of 210 g of neopentasilane.

The neopentasilane was placed in a 500-mL jacketed flask equipped with a thermocouple, magnetic stir bar, and 5-stage Oldershaw distillation column, under dry nitrogen. The neopentasilane was distilled by heating the flask at 67° C. under vacuum (~6.6 kPa). After 15 g of distillate was collected, the receiver was changed and continued distillation produced 158 g of high purity (97.1%) neopentasilane. $^1$H NMR (400 MHz, $C_6D_6$, δ): 0.10 (t, $(H_3Si)_3SiH_2CH_3$), 0.85 (br s, C—H), 1.25 (m, C—H), 2.12 (s, $PhCH_3$), 3.20-3.70 (c, Si—H), 3.45 (s, $Si(SiH_3)_4$), 3.89 (q, $(H_3Si)_3SiMeH_2$)), 7.10 (m, Ar H), where the multiplicities are defined as follows: s, singlet; t, triplet; m, multiplet; c, complex; and br, broadened. The components of the composition were identified by GC-Mass Spectrometry. The purity of the composition was calculated using the integrated $^1$HNMR spectrum as shown in Table 1.

TABLE 1

| Component | Protons | Relative Area (Integration) | Relative Moles of Component | Relative Weight (g) of Component[1] | % (w/w) of Component |
|---|---|---|---|---|---|
| Neopentasilane (MW = 152.57) | $SiH_3$ | 42.74 | 42.74/12 = 3.56 | 3.56 × 152.57 = 543.40 | 543.40/559.36 × 100 = 97.1 |
| Other Silanes | | | | | |
| Neomethylpentasilane (MW = 166.57) | $SiCH_3$ | 0.14 | 0.14/3 = 0.047 | 0.047 × 166.57 = 7.77 | 7.77/559.36 × 100 = 1.4 |
| $Si_nH_{2n+2}$ (MW ≈ 30n) | Si—H | 43.56-42.74-0.14/3 × 11 = 0.31 | 0.31/(2n + 2) | (0.31/2n) × 30n = 4.65 | 4.65/559.36 × 100 = 0.8 |
| Hydrocarbons | | | | | |
| Toluene (MW = 92.13) | $CH_3$ | 0.04 | 0.04/3 = 0.013 | 0.013 × 92.13 = 1.23 | 1.23/559.36 × 100 = 0.2 |
| $C_nH_{2n+2}$ (n = 6-8) (MW ≈ 14n) | C—H | 0.33 | 0.33/(2n + 2) | (0.33/2n) × 14n = 2.31 | 2.31/559.36 × 100 = 0.4 |

[1]The factor "2n + 2" was simplified to "2n" in the relative weight calculations for $Si_nH_{2n+2}$ and $C_nH_{2n+2}$. The estimated error in the corresponding values of % (w/w) for these components is ±0.2%.

That which is claimed is:

1. A composition comprising:
   at least 93% (w/w) of neopentasilane;
   not greater than 5% (w/w) of other silanes; and
   not greater than 2% (w/w) of hydrocarbons.

2. The composition according to claim 1, wherein the composition comprises at least 97% (w/w) by neopentasilane.

3. The composition according to claim 1, wherein the composition comprises not greater than 3% (w/w) by other silanes.

4. The composition according to claim 1, wherein the composition comprises not greater than 1% (w/w) by hydrocarbons.

5. A method of preparing a composition comprising neopentasilane, the method comprising:
(i) treating a hexahalodisilane having the formula $X_3SiSiX_3$, wherein X is —Cl or —Br, with a tertiary amine catalyst to produce a first mixture comprising a tetrakis(trihalosilyl)-silane and a silicon tetrahalide;
(ii) separating the tetrakis(trihalosilyl)silane and the silicon tetrahalide;
(iii) treating the separated tetrakis(trihalosilyl)silane with diisobutylaluminum hydride to produce a second mixture comprising neopentasilane; and
(iv) distilling the second mixture to remove the neopentasilane.

6. The method according to claim 5, wherein the hexahalodisilane is hexachlorodisilane.

7. The method according to claim 5, wherein the tertiary amine catalyst is 1,4-diazabicyclo[2.2.2]octane.

8. The method according to claim 5, wherein the concentration of the tertiary amine catalyst is from 0.01 to 1% (w/w), based on the weight of the hexahalodisilane.

9. The method according to claim 5, wherein step (iii) and step (iv) are carried out in sequential order.

10. The method according to claim 5, wherein step (iii) and step (iv) are carried out simultaneously.

11. The method of claim 5, wherein the mole ratio of the diisobutylaluminum hydride to the tetrakis(trihalosilyl)silane is from 12 to 14.

* * * * *